United States Patent [19]
Dahlerud

[11] Patent Number: 5,982,572
[45] Date of Patent: Nov. 9, 1999

[54] METHOD AND APPARATUS FOR ENABLING FAST ACCESS TO A LOGICAL BLOCK ON A TAPE MEDIUM

[75] Inventor: Ole Christian Dahlerud, Oslo, Norway

[73] Assignee: Tandberg Data AS, Oslo, Norway

[21] Appl. No.: 08/062,156

[22] Filed: May 6, 1993

Related U.S. Application Data

[63] Continuation of application No. 07/601,672, Oct. 23, 1990, abandoned.

[51] Int. Cl.⁶ .................................................. G11B 15/18
[52] U.S. Cl. ............................................. 360/72.2; 360/49
[58] Field of Search .............................. 360/72.1, 48, 49, 360/72.2, 74.1; 395/425

[56] References Cited

U.S. PATENT DOCUMENTS

| | | | |
|---|---|---|---|
| 4,472,750 | 9/1984 | Klumpp et al. | 360/78.02 X |
| 4,656,535 | 4/1987 | Usui | 360/72.2 |
| 4,727,439 | 2/1988 | Harrina et al. | 360/49 |
| 4,747,126 | 5/1988 | Hood et al. | 379/74 |
| 4,775,969 | 10/1988 | Osterlund | 360/72.2 X |
| 4,805,046 | 2/1989 | Kuroki et al. | 360/48 |
| 4,858,039 | 8/1989 | Mintzlaff | 360/72.2 |
| 4,870,515 | 9/1989 | Stokes | 360/72.2 |
| 4,958,244 | 9/1990 | Inazawa et al. | 360/72.1 |
| 5,164,865 | 11/1992 | Shaw | 360/72.2 |
| 5,179,479 | 1/1993 | Ahu | 360/72.2 X |

FOREIGN PATENT DOCUMENTS

| | | |
|---|---|---|
| 2-122489 | 5/1990 | European Pat. Off. . |
| 2-61878 | 3/1990 | Japan . |

*Primary Examiner*—Andrew L. Sniezek
*Attorney, Agent, or Firm*—Hill & Simpson

[57] ABSTRACT

A method and apparatus is disclosed for fast access to any logical block on a media not containing logical block addressing. Categorizing marks such as filemarks or setmarks are provided on the tape medium at various points along the medium. The medium is divided up into a plurality of physical blocks. To permit fast access to a logical block on the tape, a connection table in the form of a block map is provided which establishes a relationship between logical blocks and the tapemarks, and defines physical positions of at least some of the tapemarks.

13 Claims, 5 Drawing Sheets

FIG. 4

| | MAP QUALIFIER "TD MAP" 30 | | | BLOCK MAP 29 | |
|---|---|---|---|---|---|
| | | | | BLOCKS/TRACK 31 | REVISION 32 |
| | 33 | 34 | 35 | 36 | 37 |
| | BLOCK INFO. BI | LOGICAL BLOCK NO. | FILE INFO. FI | LOGICAL FILE MARK NO. | LOGICAL SET MARK NO. |
| $E_0$ | | | | | |
| $E_1$ | '' | '' | '' | '' | '' |
| $E_2$ | '' | '' | '' | '' | '' |
| $E_N$ | '' | '' | '' | '' | '' |
| $E_{OR}$ | '' | '' | '' | '' | '' |

METHOD AND APPARATUS FOR ENABLING FAST ACCESS TO A LOGICAL BLOCK ON A TAPE MEDIUM

This is a continuation of application Ser. No. 07/601,672, filed Oct. 23, 1990 now abandoned.

BACKGROUND OF THE INVENTION

The invention relates to a method and apparatus for accessing a logical block on a tape storage medium.

Today many devices like tape streamers do not support any means of fast access to logical blocks of positions on the tape. The reason is that the tape format does not contain any direct logical block count information. A logical block on those formats are only detected by special start or end information that does not contain a number or count. A positioning to any logical position is therefore only possible by reading all blocks from the start to the end while counting logical blocks. This method is extremely time consuming. For a standard QIC 525 cartridge in reverse direction, a worst case time will be many hours.

The QIC 525 is a well known type of standardized tape which is used in a tape drive known as a "tape streamer". QIC stands for "quarter inch cartridge" and "525" stands for the tape storage—namely 525 megabytes. Typically such tapes have 26 tracks.

Such tapes together with the tape streamer has as their main function the back-up of hard disk drives for archival storage. They are also useful for various types of software distribution and in some cases replace floppy disks.

Such tapes typically have a plurality of physical blocks located thereon, most of which contain data. Logical blocks corresponding to the data from the host computer may correspond to less than one physical block, or a plurality of physical blocks may be used for a single logical block.

The logical blocks are grouped or categorized under what are known as files separated with filemarks, and the files may be grouped or categorized under what are known as sets separated with setmarks.

A typical logical data block might, for example, be 1000 bytes whereas a typical physical data block might be 1024 bytes.

Other types of standardized back-up tapes used in tape streamers are known as the QIC 120 or the QIC 150 (120 or 150 megabytes, respectively). Those formats support only fixed blocks, but some vendors for those formats also provide logical blocks of variable size.

The QIC format tapes (QIC 120/150/525) may also contain what are known as either control blocks or filler blocks, such as in a trailer field at the end of the tape. Such tapes are also typically appended with data when additional data is to be added.

To enable a host system to position on a media such as a tape medium without having to read data, so called Space and Locate commands are known. Space commands are used to position the tape logically forward or reverse a certain number of blocks, filemarks or setmarks relative to a present logical position. The Locate command is used to position the tape to an absolute logical block address counting from Beginning Of Media (BOM). The difference between these commands from a drive point of view is how blocks should be counted, and if tape should be moved in a logical forward or reverse direction. Normal space foward and normal space reverse will now be described hereafter.

Normal space forward is done by skipping one datablock or tapemark block at a time while decrementing a desired count value until all blocks or tapemarks are found, or until a stop condition is detected. A stop condition may arise when a tapemark is detected while spacing blocks, a setmark is found while spacing filemarks, a bad block is found, or an error condition is detected. When skipping blocks or tapemarks, the logical block and tapemark counters will be updated.

Normal space reverse is more difficult to execute than normal space forward. The reason is that the drive is not able to read in reverse direction. The drive will therefore have to position the tape so that it can read data to fill the buffer with data logical in front of the present position. It will then have to test the buffer in reverse order until the end condition is met, or until the front of the buffer is met. If the front is met (buffer empty situation) the drive will have to calculate the address of the first block in the next buffer logical in front of the last, and start reading those blocks. The sequence will repeat until the stop condition is met. Each time a new buffer is read, the tape will have to stop and move logical reverse to position in front of the first block in the previous buffer, and then start logical forward again to read the blocks. This means a lot of start stop operation is necessary and very low performance results.

SUMMARY OF THE INVENTION

It is an object of this invention to provide a new method that will enable fast access to any logical block on a medium that does not contain logical block addressing.

The new method of the invention avoids the problems with logical block addresses in the tape format and enables fast access to any position in both forward and reverse direction in a minimum of time. A worst case for a standard QIC 525 tape cartridge in the reverse direction will, in comparison with the standard method, be reduced from several hours to approximately 3 minutes.

To avoid the problems resulting from a lack of logical block addresses on the tape itself, in the tape drive method and apparatus of the invention, a connection table between logical blocks, tapemarks and their corresponding physical block and track position is generated during reading and writing. This information, called the Block Map, does not have to have an entry (relation between a given logical block and physical block and track) for every logical block or tapemark. It is sufficient to have entries at given intervals. If the distance between those intervals (in time) is short enough (i.e. every 5 sec.) the loss in performance will be unimportant compared to the saving of storage to hold the Block Map.

If a tape drive has such a Block Map available, it is easy according to the invention, to make a fast access to any given position by just doing a search to the closest entry with a known logical block, physical block and track position, and then read and skip blocks while counting logical blocks until the desired end position is found. This method works equally fine both in the logical forward and reverse directions.

The Block Map information of a particular tape is, of course, lost if the tape is removed from the drive, or if power is lost. Therefore, the Block Map has to be written on the tape media itself. This can be done in such a way that it does not conflict with any tape format or data and so that it will be totally transparent for tape drives without this new feature of the invention. The Block map may be written to the tape at given intervals, or at the start or the end of the tape, or at combinations of those places. It is most efficient to put it at the beginning of the media by overwriting a reserved area at this position. The drive will then have all the information needed to address any logical position as soon as it has "loaded" the tape and read the Block Map.

BRIEF DESCRIPTION OF THE DRAWINGS

FIG. 4 shows a Block Map layout according to the invention; and

DESCRIPTION OF THE PREFERRED EMBODIMENTS

Figure 1:
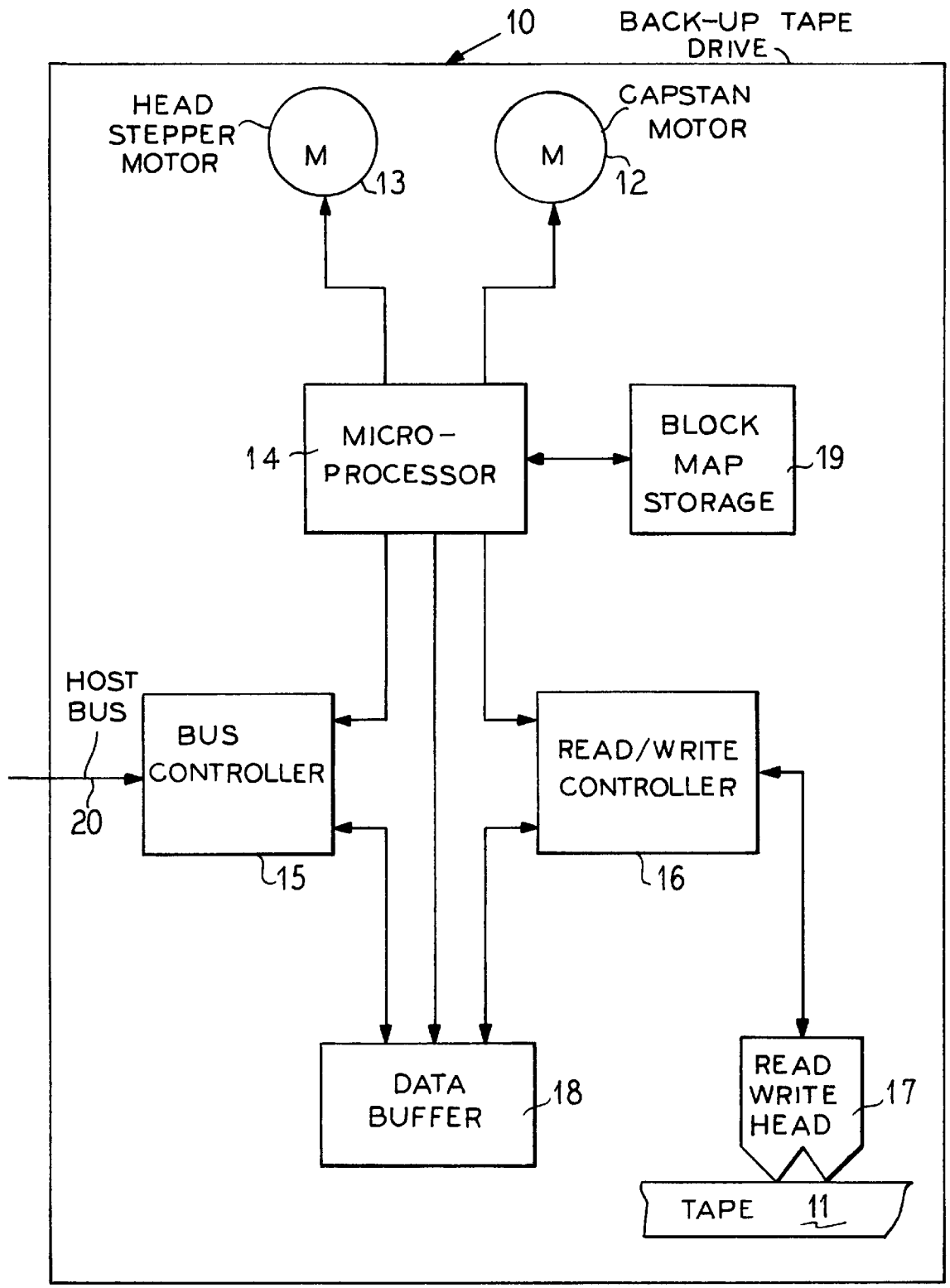
FIG. 1 is a block diagram of the back-up tape drive or tape streamer having the method and apparatus of the invention contained therein and which is operable with a back-up tape which may have recorded on it the Block Map according to the invention.

As shown in FIG. 1, a fast seek or fast space is provided in conjunction with a back-up tape drive or tape streamer 10. The tape drive 10 is operable with a back-up or streamer tape 11. A capstan motor 12 is provided for driving the tape 11, and a head stepper motor 13 is provided in known prior art fashion. Also as known in the prior art, a microprocessor 14 is provided for driving the capstan motor 12 and head stepper motor 13 for positioning a read/write head 17 on different tracks of the tape 11.

As is also known in the prior art, a host bus 20 provides data from the host computer for which a back-up function is being performed and provides such data at a first clock rate to a bus controller 15. Since the tape 11 and tape drive 10 usually is operating at a different data transfer rate, a bus controller 15 is provided in known prior art fashion which operates in conjunction with a data buffer 18 also known in the prior art so as to adjust for the different data transfer rates. A read/write controller 16 is also provided for driving the read/write head 17 as known in the prior art.

According to the invention, a block map storage 19 is provided such as by a RAM memory. The block map being stored will be discussed hereafter, particularly with reference to FIG. 4.

Figure 2:
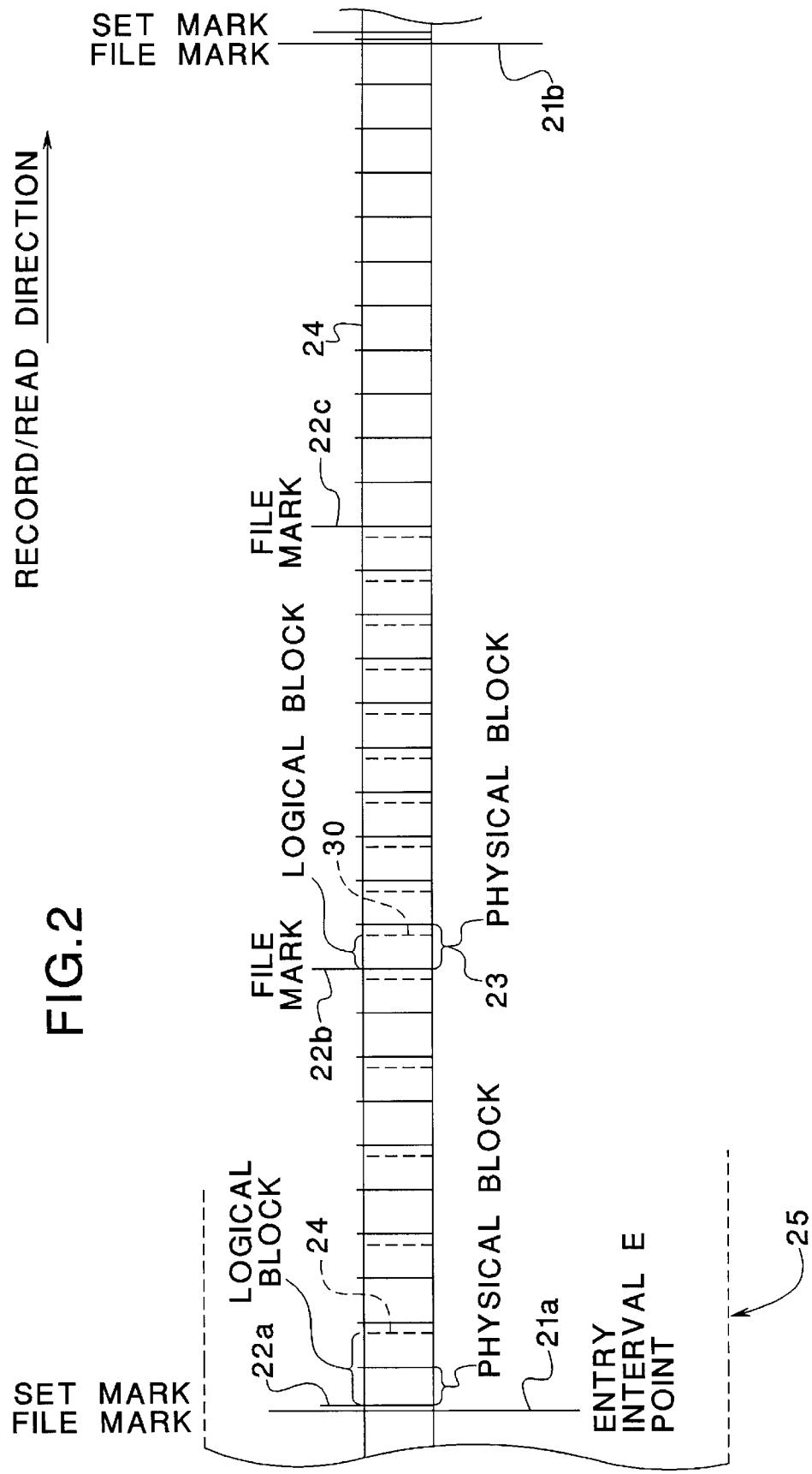
FIG. 2 is a diagram of one track of a multi-track back-up or streamer tape used with the apparatus of FIG. 1 and showing the positions-of an entry interval point, setmark, filemark, physical blocks, and logical blocks thereon.

As shown in FIG. 2, a typical tape 25 such as a QIC 525 has a plurality of tracks, such as 26 tracks thereon. A portion of one of those tracks 24 is shown. As is known in the prior art, a plurality of filemarks 22a, 22b, and 22c may be provided on the tape. The tape itself is divided up into given physical blocks such as 1024 bytes. The data is recorded on the tape in the form of logical data blocks which might either be smaller or larger than a physical block. Such physical blocks are shown at 23a–23j. One type of logical block is shown at 24 which is larger than one physical block. A logical block 30 which is smaller than a physical block 23 is also shown following the filemark 22b.

Typically a plurality of the filemarks are grouped under one or more setmarks such as shown at 21a and 21b.

According to the invention, a particular entry interval point E might coincide with one of the setmarks 21a. An entry interval, as described hereafter, may comprise a plurality of setmarks, with each setmark having a plurality of filemarks categorized therewith. According to the invention, the entry point interval is chosen sufficiently large so that the entry point can be rapidly accessed and located on the tape as explained hereafter.

Fast Space Introduction

There are two reasons why the fast space or fast seek method of the invention can work faster than the previously discussed normal space methods.

With the fast space method of the invention it is not necessary to read in serpentine mode through the tracks to get to the desired end position. The fast operation will instead use a map information and go directly to the track for the desired block. In this way, the maximum tape travel time will be one track or 1 minute compared to 26 tracks or 26 minutes for the normal space method, for example.

For space reverse operations the drive will not have to read one buffer at a time to test all blocks. Instead, the drive will position the tape directly to the desired track close in front of the end position, and will read in a forward direction to the end position. The maximum tape travel time will therefore also in this case be approximately 1 minute. For comparison, a normal space reverse from EOT (end of tape) to BOT (beginning of tape) will take many hours due to all the tape repositionings.

Fast Functions; Basic Operation

Figure 3:
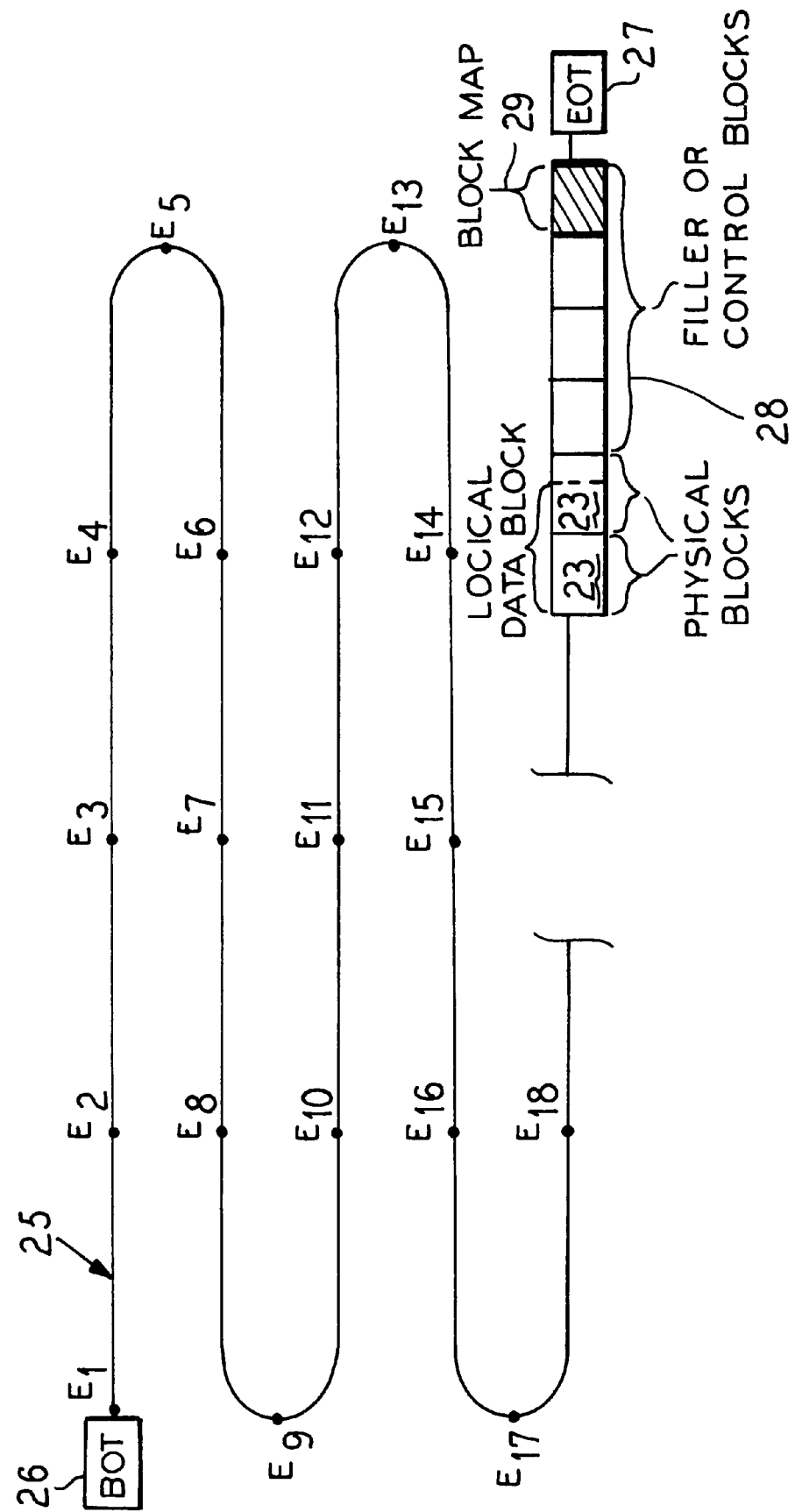
FIG. 3 is a diagram of a tape showing in serpentine fashion the beginning and end of the tape together with various entry interval points thereon according to the invention, and the storage location of a Block Map thereon.

A serpentine illustration of the back-up tape 25 is shown in FIG. 3. As is known, such a tape has a BOT 26 (beginning of tape) and an EOT 27 (end of tape). A plurality of entry points E1 through En are provided as described hereafter. Also as described hereafter, the block map 29 is located in one of the filler or control blocks 28, preferably at the end of the tape. However, the block map could be at other locations on the tape.

All fast functions use the present logical position and a Block Map as a base for execution. The logical position is determined by a set of logical counters counting logical Blocks, Filemarks, and Setmarks from BOT. The Block Map is a table where the logical counters for different physical block positions on the tape are recorded. The basic functions for the fast operations are:

Find the entry in the Block Map that is closest in front of the desired end position.

The entry in the map corresponds to a physical block location on the tape and to a certain track. The drive will position the head to this track and move the tape until the physical block is found.

When the physical block is found, the logical counters are overwritten with the values found in the Block Map. This assures a match between the physical and logical block location.

Normally the desired end position will be different from the entry position found in the map. The last step is therefore to space forward some blocks until the desired end position is found. The different Fast functions only differ in how the information in the Block Map is handled.

When executing a locate command, the map is tested until the nearest entry in front of the end position is found.

When spacing forward, the logical end address is encountered by adding the desired space count to the present logical position.

When spacing in reverse, the logical end address is found by subtracting the space count from the present position.

Due to the requirement that spaces should stop if Tapemarks are detected when spacing Blocks, or Setmarks are detected when spacing Filemarks, the Block map testing includes checks for this.

If a Tapemark is detected before the requested end position, the tape has to be positioned to this Tapemark instead of the end position, and a Check Condition and a Residual Count should result. The Residual Count is always calculated by subtracting the logical end position from the present position for forward spacing, or subtracting the present position from the logical end position for the reverse direction.

Generation of Block Map in Memory

As shown in FIG. 4, a block map 29 is a so-called header field E0 which has a map qualifier information 30 with the name in this example "TDMAP". It may also have the blocks/track information at 31 and the particular revision of the block map as shown at 32.

The fields E1 through EOR have the respective information blocks 33—block information BI; 34—logical block number; 35—file information FI; 36—logical filemark number; and 37—logical setmark number.

As mentioned previously, the Block Map is essential for the execution of Fast Spaces. This map is built up in the drive buffer while writing or reading. A dedicated routine will test the present physical block number to see if it is time for a logging of the present logical counters. Logging is done each time the physical block count is a modulo 400 hex number, i.e. on QIC tape 525, an entry in the map will result for each megabyte, while the old formats of tape QIC 120/150 will have an entry for each 512 Kb. This corresponds to approximately 5 seconds of tape travel time between entries. Entries are only put into the map the first time they occur; i.e. if an entry is already updated, it will not be overwritten.

During write operation, the routing is called each time that a new physical block is put in the buffer. The logical position is therefore synchronized with the host.

During read verify, or normal space forward operations, the routing is called each time blocks are read or skipped out of the buffer.

Relationship Between Logical and Physical Blocks

Since the relationship between logical and physical blocks is not unique (i.e. 2 logical blocks per physical block is normal), some rules have to be established. Due to the completely different way of defining variable blocks in the old formats compared to the way they are defined in the new formats, they are also handled differently in this respect:

Old formats (QIC 120/150 tape):
  The logical block number is incremented at the start of the logical block. This is because the control block containing the logical block address has to be written at this time.

New format (QIC 525 tape):
  The logical block number is incremented at the end of the logical block. This is because the drive will only know that a logical block is found when the end block is detected.

Writing of Block Map to the Tape

If the tape was never removed from the drive, or if power was never lost, it would not be necessary to save the Block Map on the tape. As this is not the case, the map has to be saved to the tape somehow and somewhere. Saving is only done during writing, and basically at the end of a write operation. At this time it will be assured that the map contained in up to 5 physical blocks is written to the tape as Filler blocks for tape QIC 525 or Control blocks for tape QIC 120/150.

The blocks are written to the tape in reverse order, i.e. the last part of the Block Map is recorded first and the first part last.

It is planned to also write the map at the beginning of the tape, as this will make it possible to get the map-information without any search operation.

Reading of Block Map from the Tape

As long as the map is not written to the beginning of the tape, the reading of the Block Map is relatively time-consuming and should therefore not be done more often than absolutely necessary. It is only done when a Space Fast Forward or a Locate operation is requested at an area on the tape that has not been written to or read from since insertion of the cartridge or power up. It can therefore only be done once per power up or cartridge insertion.

When a reading of the Block Map is necessary, the following is done:
  Find End Of Recorded area (EOR). This will position the tape behind the last physical block on the tape within approximately 120 seconds in the worst case.
  Now the tape will be repositioned so that the last blocks on the tape can be read into the buffer.
  The very last physical block before EOR is tested to see if it is a Filler or Control block containing valid Block Map information. This is done by testing the five first bytes which can read, for example "TDMAP". If it does contain the Block Map, the Block Map is then copied into the Block Map record from the data buffer, and status bits are set so that the drive will know that a valid map is present. If no Valid Block information is found, this status will also be saved. This is to avoid a second attempt to read the map.

Figure 5:
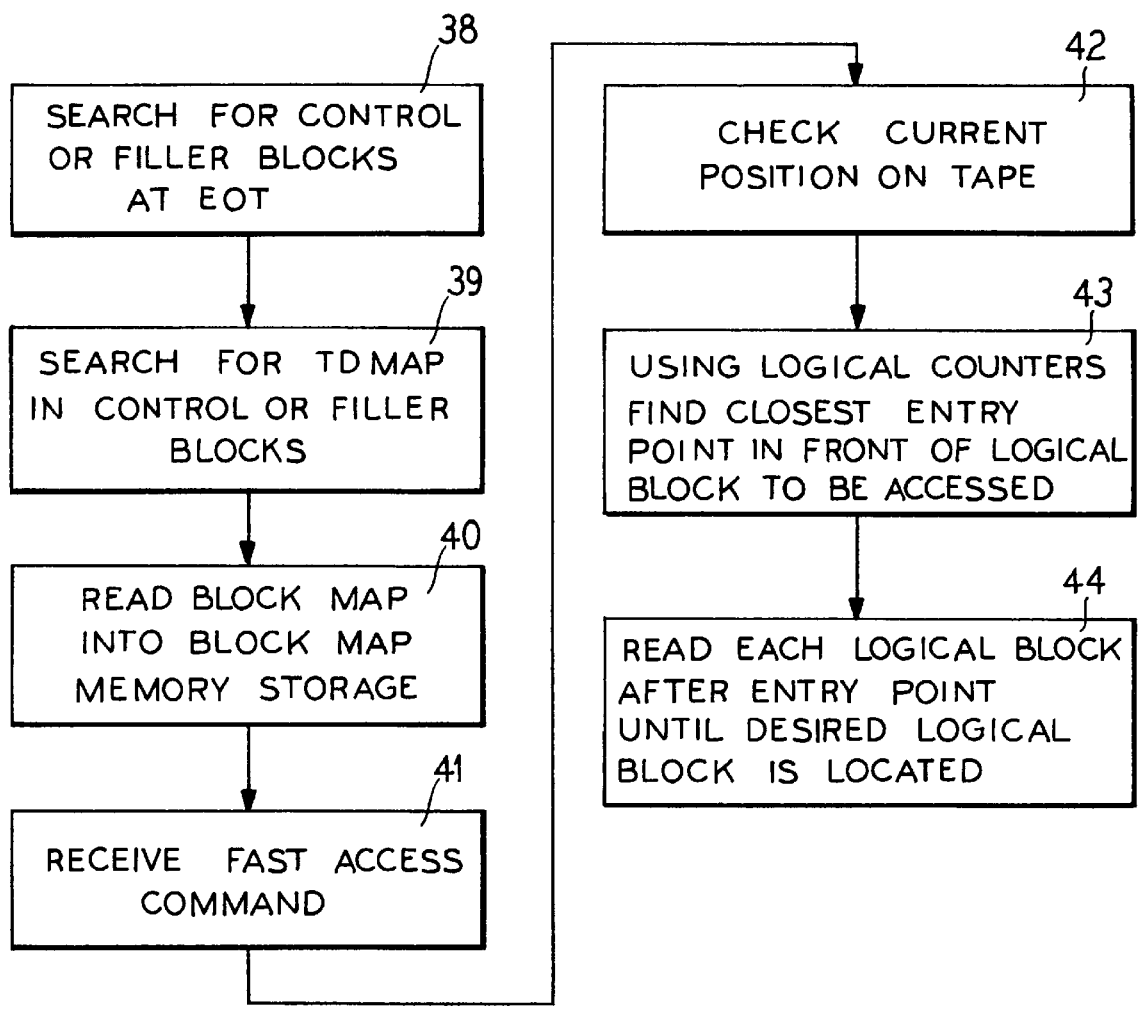
FIG. 5 shows a flow chart of steps according to the invention for utilizing the Block Map to find a logical block to be rapidly accessed.

A flow chart showing the various steps used in employing the information in the block map to find a particular logical block is indicated in FIG. 5. As shown in block 38, a search for a control or filler block occurs, preferably at the end of the tape. Once the control or filler blocks are found, these blocks are then read to find the block map which is labelled "TDMAP" as shown at 39. Thereafter, the block map is read into a block map memory storage such as a RAM 19 shown in FIG. 1. This is indicated in FIG. 5 at step 40. Thereafter, in step 41 when a fast access command is received, the current position on the tape is checked (step 42) and thereafter, using logical counters, the closest entry point E is found in front of the logical block to be accessed (step 43). Thereafter, after the entry point has been located, each logical block is read until the desired logical block is located (step 44 in FIG. 5).

Fast Operations on a Tape Without a Recorded Block Map

In many cases, Fast operations can be done without the tape having a Block Map. This is true for all Space Reverse operations and also for Space Forward and Locate if the drive has already read the tape up to the desired end position. If a Fast Forward Space ends outside the known area of the tape, and it is confirmed that no map is present, the Fast Space will first position at the last known position and then the rest of the space operation will follow as a Normal Forward Space.

Converting a Non Fast Space Tape to a Fast Space Tape

This can be done by reading or spacing to EOR and then appending data. Writing of O blocks and a rewind will assure that the Block Map is appended to the end of the tape.

Block Map Data Structure

The Block Map is located in the dynamic buffer. FIG. 4 as described previously, shows the layout of the Block Map. The map starts with an 8 byte Header field (EO), followed by one or more so-called Entries of 8 bytes each (E1–En). When a map is written to or read from the tape, it will also contain an 8 byte Trailer field (EOR).

The Header field contains first a 5 byte Map Qualifier with the ASCII characters "TDMAP". Only maps read from the tape with this information will be detected as valid. The next two bytes hold the number of physical blocks that were written on the first track. This information is used to get the track number of a particular entry. The last byte in the Header field is the revision number which presently is zero. This enables future updates of the map functions.

The Entry fields have the first 3 bits reserved for the Block Information (BI). Two bits may be used. The first bit is always set to one. This avoids confusion between IBM control blocks and Map Control blocks. The next bit is set when the logical block at the entry point is an old variable block (tape QIC 120/150).

The Logical Block Number is held in the next 21 bits. It is a copy of the logical block number (LOG BLK NO) at the time of the entry.

The Filemark Information (FI) has reserved 3 bits. Presently, only the first is used. The bit is set if the physical block at the entry point is a Filemark. The bit is never tested. It is a preparation for eventual Fast Space Sequential Filemark operation.

The Logical Filemark Number is held in the next 21 bits. It is a copy of the logical filemark number (LOG FMK NO) at the time of the entry.

The Logical Setmark Number is held in the last 16 bits. It is a copy of the logical setmark number (LOG SMK NO) at the time of the entry.

The first Entry field (E1) holds the logical counters for the physical blocks address 400 hex.

The second Entry field (E2) holds the logical founters for the physical block address 2*400 hex=800 hex.

The third Entry field (E3) holds the logical counters for the physical block address 3*400 hex=1200 hex.

The nth Entry field (En) holds the logical counters for the physical block address n*400 hex.

The Trailer field (EOR) has the same layout as the Entry fields. This field is, however, used to hold the logical counters at EOR. This permits appending at tape EOR without having to synchronize at the last entry point. The trailer field will be overwritten when new data is appended to the tape.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for rapidly accessing a desired logical data block identified by a logical block number on a tape, comprising steps of:
   providing the tape with a plurality of categorizing marks wherein a plurality of logical blocks are respectively grouped following the data categorizing marks;
   providing a categorizing mark counter which counts the categorizing marks;
   providing a logical block counter;
   providing in memory a block map formed as an information table defining a plurality of entry points corresponding to a plurality of entry point intervals to be defined, for each entry point said block map defining its location on the tape in terms of said categorizing marks and a logical block number; and
   upon receiving a command to locate said desired logical block, checking said block map to determine a closest entry point which directly precedes the desired logical block to be located, using the categorizing mark counter to locate said nearest entry point, and then without any further referral to another block map serially reading the logical blocks directly following the entry point in order to count each logical block which is traversed, and incrementing the logical block counter until it reaches said logical block number of said desired logical data block.

2. A method according to claim 1 wherein the categorizing marks comprise a plurality of setmarks and filemarks and wherein each setmark has a plurality of filemarks associated therewith, and wherein the categorizing mark counter counts both setmarks and filemarks, and the information for locating the entry points in the block map contains both filemark and setmark information defining the locations of the various entry points on the tape.

3. A method according to claim 1 wherein the block map is stored on the tape and, if not previously read into memory, information on the tape is read to locate the block map and the block map is then read into memory for future use.

4. A method according to claim 3 wherein the block map is located in a filler block at the end of the tape.

5. A method according to claim 3 wherein the block map is located in a control block at the end of the tape.

6. A method for fast access to any desired logical block having a corresponding logical block number on a tape not containing logical block addressing, comprising the steps of:
   providing marks on the tape at various points along the tape, said tape being divided up into a plurality of physical blocks;
   providing a logical block counter;
   permitting fast access to a desired logical block on the tape by providing a connection table in the form of a block map which establishes a relationship between logical blocks and said marks, and defines physical positions of at least some of said marks as entry points in terms of logical block number; and
   by use of said table, moving the tape to a mark in front of the desired logical block and then, without reference to any further block map, reading the tape in one given direction only in order to count each logical block which is read so as to increment said logical block counter until the desired logical block is located as indicated by said logical block counter reaching said logical block number of said desired logical block.

7. A method according to claim 6 wherein the block map is recorded at a defined place on the medium.

8. A system for rapidly accessing a logical data block having a corresponding logical block number on a tape, comprising:
   a plurality of categorizing marks on the tape and wherein a plurality of logical blocks are respectively grouped following the data categorizing marks;
   categorizing mark counter means for counting the categorizing marks;
   a logical block counter;
   memory means having stored therein a block map formed as an information table defining a plurality of entry points corresponding to a plurality of entry point intervals to be defined, for each entry point said block map defining its location on the tape in terms of said categorizing marks and a logical block number;
   means for checking said block map upon receiving a command to locate said desired logical block to determine a closest entry point which directly precedes the logical block to be located;
   means for using the categorizing mark counter means to locate said nearest entry point; and means for then locating the desired logical block without reference to any further block maps by reading the logical blocks directly following the entry point in order to count logical blocks and increment the logical block counter until the desired logical block is located as indicated by said logical block counter having a count corresponding to said logical block number of said desired logical block, and then stopping directly at the desired logical block.

9. A system for fast access to any logical block having a corresponding logical block number on a tape not containing logical block addressing, comprising:

means for providing tapemarks on the tape at various points along the tape, said tape being divided up into a plurality of physical blocks;

a logical block counter;

means for permitting fast access to a desired logical block on the tape by providing a connection table in the form of a block map which establishes a relationship between logical blocks and said tapemarks and defines physical positions of at least some of said tapemarks serving as entry points based on logical block number; and means for moving the tape to an entry point at a tape mark in front of the desired logical block and then, without any further referral to another block map, reading the tape in one direction only following the entry point in order to count logical blocks and increment said logical block counter until the desired logical block is reached as indicated by said logical block counter having a count corresponding to the logical block number of said desired logical block.

10. A method for rapidly accessing a desired logical data block identified by a logical block number on a tape, comprising the steps of:

providing a tape having a plurality of physical blocks and logical blocks, said logical blocks being formed of at least a portion of said physical blocks;

providing a logical block counter;

providing in memory a block map formed as an information table defining a plurality of entry points on the tape in terms of logical block number; and upon receiving a command to locate said desired logical data block, checking said block map to determine a closest entry point which directly precedes the desired logical data block to be located as indicated by said entry point having a logical block number lower than the desired logical data block number, positioning the tape to said entry point, and then incrementing said logical block counter by reading said tape in order to count logical blocks following the entry point until the logical block counter reaches said desired logical data block number, at which time the tape has been successfully positioned to the desired logical data block.

11. A method according to claim 10 wherein upon reaching said entry interval, said logical block counter is set to the logical block number corresponding to said entry point.

12. A method according to claim 11 wherein logical block numbers in the block map corresponding to the entry points correspond to numbered physical block locations on the tape, and the tape is positioned to the entry point by moving the tape until the physical block is found, and when the physical block is found, the logical block counter is overwritten with the logical block number found in the block map corresponding to the entry interval.

13. A system for rapidly accessing a desired logical data block identified by a logical block number on a tape, comprising:

a tape having a plurality of physical blocks and logical blocks, said logical blocks being formed of at least a portion of said physical blocks;

a logical block counter;

a memory having a block map therein formed as an information table defining a plurality of entry points on the tape in terms of logical block numbers; and means for checking said block map upon receiving a command to locate said desired logical data block to determine a closest entry point which directly precedes the desired logical data block to be located as indicated by said entry point having a logical block number lower than the desired logical data block number, positioning the tape to said entry point, and then incrementing said logical block counter by reading said tape in order to count logical blocks following the entry point until the logical block counter reaches said desired logical data block number, at which time the tape has been successfully positioned to the desired logical data block.

* * * * *